(12) United States Patent
Onishi et al.

(10) Patent No.: US 6,786,964 B2
(45) Date of Patent: Sep. 7, 2004

(54) FINE PARTICLE OF ALUMINUM HYDROXIDE FOR FILLING RESIN AND RESIN COMPOSITION USING THE SAME

(75) Inventors: Akira Onishi, Kanagawa (JP); Yukihiko Takahashi, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 89 days.

(21) Appl. No.: 09/904,558

(22) Filed: Jul. 16, 2001

(65) Prior Publication Data

US 2003/0207980 A1 Nov. 6, 2003

Related U.S. Application Data

(60) Provisional application No. 60/240,831, filed on Oct. 17, 2000.

(30) Foreign Application Priority Data

Jul. 17, 2000 (JP) ..................................... P2000-216488

(51) Int. Cl.[7] ............................. C08K 3/20; C08L 67/06
(52) U.S. Cl. .................... 106/287.17; 524/437; 524/605
(58) Field of Search ................................. 523/513, 514; 524/399, 437, 605; 106/287.17, 286.5

(56) References Cited

U.S. PATENT DOCUMENTS

| | | | | |
|---|---|---|---|---|
| 4,251,430 A | * | 2/1981 | Kennedy-Skipton et al. | .... 523/514 |
| 4,829,103 A | * | 5/1989 | Oda et al. | ..................... 523/220 |
| 4,916,023 A | * | 4/1990 | Kawabata et al. | .......... 428/482 |
| 5,130,113 A | * | 7/1992 | Kitayama et al. | ........... 423/629 |

* cited by examiner

Primary Examiner—Callie Shosho
(74) Attorney, Agent, or Firm—Sughrue Mion, PLLC

(57) ABSTRACT

A fine particle of aluminum hydroxide is disclosed, comprising a particulate aluminum hydroxide X having a specific surface area of 1.0 m$^2$/g or less and a secondary particle size of 35 to 150 μm, a particulate aluminum hydroxide Y having a specific surface area of 1.0 m$^2$/g or less and a secondary particle size of 10 to 35 μm and a particulate aluminum hydroxide Z having a specific area of 3.0 m$^2$/g or less and a secondary particle size of 0.5 to 10 μm, in a compositional mass ratio falling in the area surrounded by four points of Point α, Point β, Point γ and Point δ including the lines in the ternary composition diagram shown in FIG. 1. By this fine particle of aluminum hydroxide, a fine particle of aluminum hydroxide and a resin composition comprising the fine particle of aluminum hydroxide, which can be reduced in the viscosity at the filling in a resin and attain high filling and when filled in a thermosetting resin, can be shortened in the curing time, can be provided.

11 Claims, 3 Drawing Sheets

[Fig. 1]
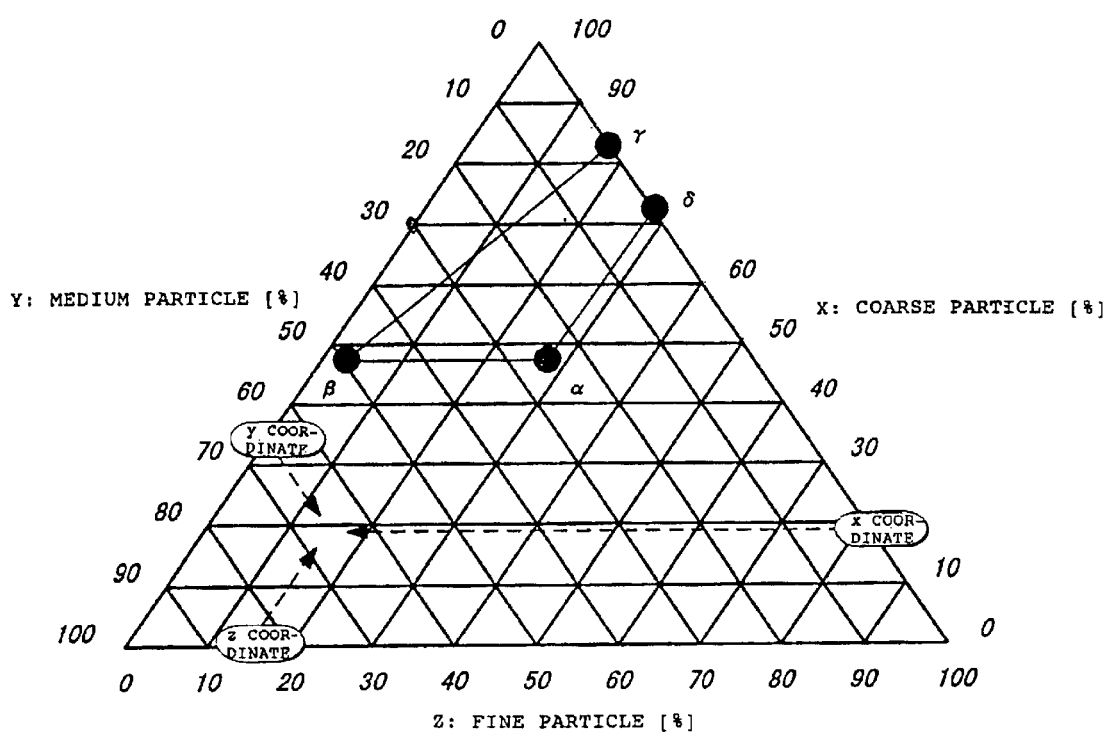

[Fig. 2]
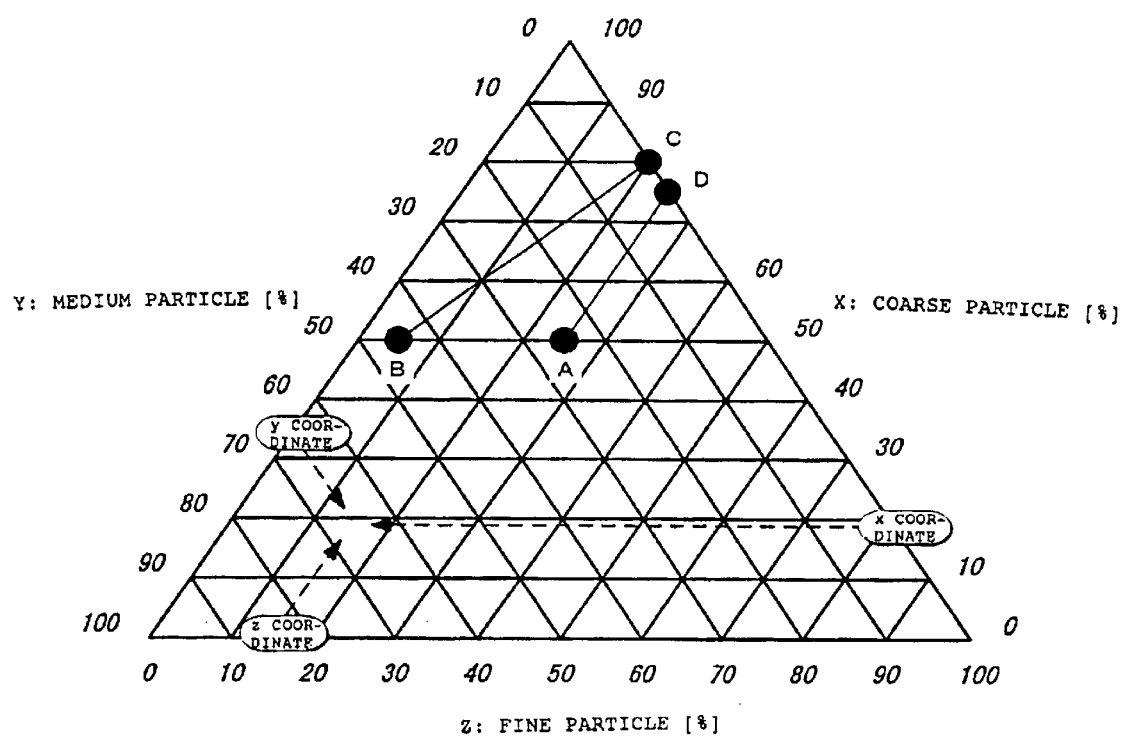

[Fig. 3]
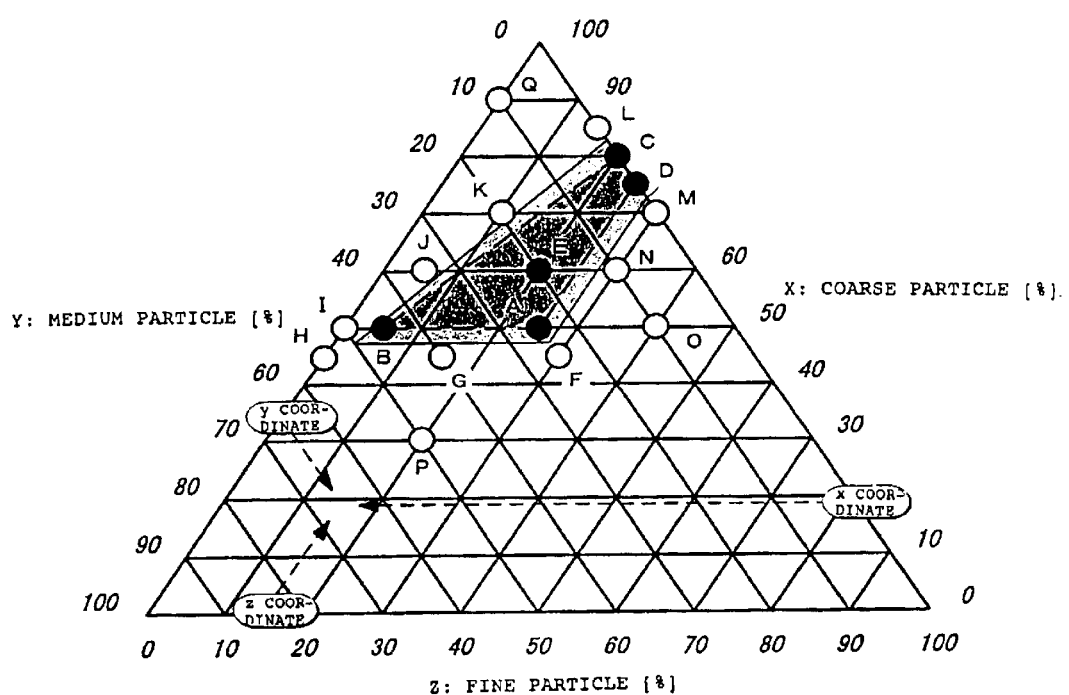

FINE PARTICLE OF ALUMINUM HYDROXIDE FOR FILLING RESIN AND RESIN COMPOSITION USING THE SAME

CROSS REFERENCE TO RELATED APPLICATIONS

This application is an application filed under 35 U.S.C. §111(a) claiming benefit pursuant to 35 U.S.C. §119(e)(1) of the filing date of the Provisional Application 60/240,831 filed Oct. 17, 2000 pursuant to 35 U.S.C. §111(b).

FIELD OF THE INVENTION

The present invention relates to a fine particle of aluminum hydroxide for filling in a resin, which is used as a flame retardant or the like in plastic, rubber and the like, and also relates to a resin composition comprising the fine particle of aluminum hydroxide.

BACKGROUND OF THE INVENTION

The aluminum hydroxide has been conventionally used over the wide range as a filler for filling in rubbers and plastics, for example, as a flame retardant in a thermoplastic resin, a rubber and an epoxy resin or as a toning filler in a thermosetting resin such as unsaturated polyester resin and acrylic resin.

In the case of using the aluminum hydroxide as a flame retardant, the flame resistance is more improved as the amount of aluminum hydroxide filled is larger. However, if the amount filled is increased, the moldability or kneading torque increases and in turn the molding temperature increases, as a result, the aluminum hydroxide disadvantageously undergoes partial dehydration and foaming. In the case of filling the aluminum hydroxide into a thermosetting resin, the material cost may be lowered by increasing the amount filled, however, a problem arises, such as deterioration in the mold-workability or reduction in the curing speed.

A resin composition obtained by filling fine particles of aluminum hydroxide in an unsaturated polyester resin, acrylic resin or the like is especially used as an artificial marble for the constructive material of bath tab, kitchen counter and the like. However, in order to bring out a texture (solemnity) close to natural marble, a large amount of fine particles of aluminum hydroxide must be filled into the resin.

For solving these problems, various techniques have been heretofore disclosed, for example, (1) a method of using a mixture with agglomerated coarse particles as a primary particle or fine particles obtained by grinding the coarse particles (see, JP-B-5-48782 (the term "JP-B" as used herein means an "examined Japanese patent publication")) and (2) a method of grinding a particulate aluminum hydroxide specified in the particle diameter or soda content to obtain aluminum hydroxide having a small specific surface area (see, JP-B-4-6648 and JP-B-6-49573) are known.

The technique (1) above has a problem in that coarse particles used alone precipitate at the molding and this causes reduction in the surface smoothness or in the strength of the molded article and when used in combination with fine particles, the curing time is prolonged as the specific surface area is increased. In the technique (2), the curing time is also prolonged due to increase in the specific surface area after the grinding or cracking of agglomerated particles and when these particles are used alone, the amount filled is limited because the particles are fine.

In order to improve the filling property into a resin, a surface treatment with a fatty acid, a silane coupling agent or the like is often performed.

SUMMARY OF THE INVENTION

Under these circumstances, the object of the present invention is to improve conventional fine particles of aluminum hydroxide for filling in a resin such as plastic and rubber and provide a fine particle of aluminum hydroxide which can be reduced in the viscosity at the filling into a resin to attain high filling and when filled into a thermosetting resin, can ensure reduction in the curing time and more increase in the productivity. The object of the present invention includes providing a resin composition comprising the fine particle of alumina hydroxide.

As a result of extensive investigations to develop an aluminum hydroxide having the above-described preferred properties, the present inventors have found that when a fine particle of aluminum hydroxide is obtained by blending at least two components (binary system), preferably three components (ternary system), the object of the present invention can be attained. The present invention has been accomplished based on this finding. More specifically, the present invention provides the following inventions.

[1] A fine particle of aluminum hydroxide for filling in a resin, which has properties such that when 200 parts by weight of the fine particle of aluminum hydroxide is filled into 100 parts by weight of an unsaturated polyester resin (Rigolac 2004WM-2, produced by Showa Highpolymer Co., Ltd.), the viscosity can be less than 200 poises in the measurement at 35° C. by a Brookfield viscometer and that when 150 parts by weight of the fine particle of aluminum hydroxide is filled into a resin composition comprising 100 parts by weight of another unsaturated polyester resin (Polylite TP-123, produced by Dai-Nippon Ink & Chemicals, Inc.) and 2 parts by weight of methyl ethyl ketone peroxide, the curing time until the viscosity becomes immeasurable due to the curing of resin can be less than 20 minutes in the measurement at 35° C. by a Brookfield viscometer.

[2] A fine particle of aluminum hydroxide comprising a particulate aluminum hydroxide X having a BET specific surface area of 1.0 m$^2$/g or less and a secondary particle size of 35 to 150 μm, a particulate aluminum hydroxide Y having a BET specific surface area of 1.0 m$^2$/g or less and a secondary particle size of 10 to 35 μm, and a particulate aluminum hydroxide Z having a BET specific area of 3.0 m$^2$/g or less and a secondary particle size of 0.5 to 10 μm, in a compositional mass ratio falling in the area surrounded by four points of Point α (X:Y:Z=47.5:25.0:27.5), Point β (X:Y:Z=47.5:50.0:2.5), Point γ (X:Y:Z=82.5:0.0:17.5) and Point δ (X:Y:Z=72.5:0.0:27.5) including the lines in the ternary composition diagram shown in FIG. 1 where the entire is assumed to be 100% by mass.

[3] A fine particle of aluminum hydroxide comprising a particulate aluminum hydroxide X having a BET specific surface area of 1.0 m$^2$/g or less and a secondary particle size of 35 to 150 μm, a particulate aluminum hydroxide Y having a BET specific surface area of 1.0 m$^2$/g or less and a secondary particle size of 10 to 35 μm, and a particulate aluminum hydroxide Z having a BET specific area of 3.0 m$^2$/g or less and a secondary particle size of 0.5 to 10 μm, in a compositional mass ratio falling in the area surrounded by four points of Point A (X:Y:Z=50.0:25.0:25.0), Point B (X:Y:Z=50.0:45.0:5.0), Point C (X:Y:Z=80.0:0.0:20.0) and Point D (X:Y:Z=75.0:0.0:25.0) including the lines in the ternary composition diagram shown in FIG. 2 where the entire is assumed to be 100% by mass.

[4] The fine particle of aluminum hydroxide as described in [2] or [3], wherein the particulate aluminum hydroxide X has a secondary particle size of 50 to 150 μm, the particulate aluminum hydroxide Y has a secondary particle size of 10 to 25 μm and the particulate aluminum hydroxide Z has a secondary particle size of 0.5 to 8 μm.

[5] A resin composition comprising the fine particle of aluminum hydroxide described in any one of [1] to [4].

[6] A resin composition comprising the fine particle of aluminum hydroxide described in any one of [1] to [4], wherein the viscosity measured at 35° C. by a Brookfield type viscometer is less than 200 poises.

[7] A resin composition comprising the fine particle of aluminum hydroxide described in any one of [1] to [4], which is a resin composition for forming an artificial marble.

[8] A resin composition comprising the fine particle of aluminum hydroxide described in any one of [1] to [4], which comprises at least one resin selected from the group consisting of an unsaturated polyester resin, an acrylic resin, a vinyl ester resin and an epoxy resin.

[9] A resin composition comprising the fine particle of aluminum hydroxide described in any one of [1] to [4], which is a cured resin composition.

BRIEF DESCRIPTION OF THE DRAWINGS

FIG. 1 shows a ternary composition diagram relating to a fine particle of aluminum hydroxide according to one example of the present invention.

FIG. 2 shows a ternary composition diagram relating to a fine particle of aluminum hydroxide according to one example of the present invention.

FIG. 3 shows a ternary composition diagram relating to a fine particle of aluminum hydroxide prepared in one of the Examples.

DETAILED DESCRIPTION OF THE INVENTION

The present invention is described in detail below.

The fine particle of aluminum hydroxide of the present invention is a fine particle of aluminum hydroxide for filling in a resin, which has properties such that when 200 parts by weight of the fine particle of aluminum hydroxide is filled into 100 parts by weight of an unsaturated polyester resin having a viscosity of 10 poises at 20° C. measured by a Brookfield viscometer (Rigolac 2004WM-2, produced by Showa Highpolymer Co., Ltd.), the viscosity of the resulting resin composition can be less than 200 poises in the measurement at 35° C. by a Brookfield viscometer and that when 150 parts by weight of the fine particle of aluminum hydroxide and 2 parts by weight of methyl ethyl ketone peroxide are filled into 100 parts by weight of another unsaturated polyester resin having a viscosity of 18 poises at 25° C. measured by a Brookfield viscometer (Polylite TP-123, produced by Dai-Nippon Ink & Chemicals, Inc.), the curing time of the resulting resin composition until the viscosity becomes immeasurable due to the curing of resin can be less than 20 minutes in the measurement at 35° C. by a Brookfield viscometer.

The present inventors have found that the surface of a fine particle of aluminum hydroxide is covered with many OH groups, therefore, when incorporated into a curable resin or the like, the fine particle of aluminum hydroxide inhibits the curing reaction of the curable resin and prolongs the curing reaction. Based on this knowledge, the fine particle of aluminum hydroxide having the above-described properties has been found out.

The present inventors further studied on the BET specific area and secondary particle size of the fine particle of aluminum oxide, the filling composition, the amount filled and the like so as to find out a fine particle of aluminum hydroxide which does not inhibit the curing reaction of a resin, as a result, a specific preferred fine particle of aluminum hydroxide and the composition blending ratio thereof have been found out.

More specifically, the fine particle of aluminum hydroxide of the present invention is characterized in that when a coarse particulate aluminum hydroxide X having a secondary particle size of 35 to 150 μm, preferably from 50 to 150 μm, and a specific surface area measured by the nitrogen adsorption method (BET), of 1.0 $m^2/g$ or less, preferably 0.5 $m^2/g$ or less, a medium particulate aluminum hydroxide Y having a secondary particle size of 10 to 35 μm, preferably from 10 to 25 μm, and a specific surface area of 1.0 $m^2/g$ or less, preferably 0.8 $m^2/g$ or less, and a fine particulate aluminum hydroxide Z having a secondary particle size of 0.5 to 10 μm, preferably from 0.5 to 8 μm, and a specific area of 3.0 $m^2/g$ or less, preferably 2.0 $m^2/g$ or less, are blended in a predetermined compositional mass ratio, the viscosity at the filling in a resin can be reduced and the curing time at the filling into a thermosetting resin can be shortened.

In the present invention, the measurement of viscosity at 35° C. by a Brookfield viscometer is performed according to JIS K6901, 4.4.1. That is, a rotor is rotated in a sample using a synchronous generator and the viscous resistance torque thereof is measured by the spring balance. More specifically, 500 ml of a sample is charged into a beaker and when the sample temperature reached 35±0.5° C., the rotor of the viscometer is dipped to the marked line. After allowing to stand for about 5 minutes, the rotor is rotated for 3 minutes and the value is read. The measured value is multiplied by a multiplier decided according to the rotor used and the rotational frequency, whereby the viscosity is determined.

The "curing time until the viscosity becomes immeasurable due to curing of the resin" as used in the present invention means a time period until the rotor stops rotating and the viscosity cannot be measured when 100 parts by weight of the unsaturated polyester resin for use in the present invention and 2 parts by weight of methyl ethyl ketone peroxide are mixed and the viscosity is measured by the above-described method.

The predetermined compositional mass ratio of the fine particle of aluminum hydroxide is, for example, in the case of a fine particle by a ternary system blending, a ratio such that in the ternary composition diagram shown in FIG. 1, assuming that the entire is 100% by mass, a coarse particulate aluminum hydroxide X, a medium particulate aluminum hydroxide Y and a fine particulate aluminum particle Z are blended to fall in the area surrounded by four points of Point α (X:Y:Z=47.5:25.0:27.5), Point β (X:Y:Z=47.5:50.0:2.5), Point γ (X:Y:Z=82.5:0.0:17.5) and Point δ (X:Y:Z=72.5:0.0:27.5) including the lines (hereinafter, the blending ratio is shown in the order of X:Y:Z). In FIG. 1, Y can be present in an amount of 5% mass, and the particulate aluminum hydroxide particles are blended to fall in the area surrounded by four points of Point α, Point β, Point ε (X:Y:Z=79:5:16) and Point φ (X:Y:Z=67.5:5:27.5). The blending ratio by mass preferably falls, in the ternary composition diagram shown in FIG. 2 attached hereto, in the area surrounded by four points of Point A (50.0:25.0:25.0), Point B (50.0:45.0:5.0), Point C (80.0:0.0:20.0) and Point D (75.0:0.0:25.0) including the lines. In FIG. 2, Y can be present in an amount of 5% by mass, and the particulate aluminum hydroxide particles are blended to fall in the area surrounded by four points of Point A, Point 13, Point R (X:Y:Z=76.7:5:18.3) and Point S (X:Y:Z=70:5:25).

The viscosity as used herein is a viscosity (unit: poises) determined when a resin composition is prepared by filling 200 parts by mass of the above-described fine particle of aluminum hydroxide into 100 parts by mass of a resin (for example, a curable resin such as unsaturated polyester resin) and measured at 35° C. by a Brookfield viscometer.

The curing time can be evaluated by the time period until the viscosity becomes immeasurable due to curing of the resin when 150 parts by mass of the fine particle of aluminum hydroxide and 2 parts by mass of a radical generator such as methyl ethyl ketone peroxide compound are filled into 100 parts by mass of a curable resin (for example, unsaturated polyester resin) and the viscosity of the resulting resin composition is measured at 35° C. by a Brookfield viscometer.

The aluminum hydroxide for use in the present invention is an alumina trihydrate represented by the formula: $Al_2O_3 \cdot 3H_2O$, and the purity thereof is not particularly limited.

The coarse particulate aluminum hydroxide X for use in the present invention is an agglomerated particle precipitated by the Bayer's process and has a secondary particle size of 35 to 150 $\mu$m, preferably from 50 to 150 $\mu$m, and a specific surface area measured by the nitrogen adsorption method (BET), of 1.0 $m^2/g$ or less, preferably 0.5 $m^2/g$ or less. If the secondary particle size is less than 35 $\mu$m, since this is close to the particle size of the medium particulate aluminum hydroxide Y described later, the effect of reducing the viscosity when the particles are blended is low, whereas if the second particle size exceeds 150 $\mu$m, when the particles are filled in a resin, the strength disadvantageously decreases to an extreme extent. If the specific surface area exceeds 1.0 $m^2/g$, the curing after the filling into a resin takes a long time and this is not preferred.

The secondary particle size indicates a particle size of an agglomerate, an aggregate or a combined body formed by the aggregation of aluminum hydroxide fine particles. The measurement of the secondary particle size is performed in an ordinary manner using sieving, optical microscope, Coulter counter or laser scattering diffraction method. Among these, the laser scattering diffraction method is preferably used.

The medium particulate aluminum hydroxide Y for use in the present invention can be obtained by grinding the agglomerate of the coarse particulate aluminum hydroxide X using a known dry or wet grinder of which kind is not particularly limited or by adding the above-described agglomerate to an alkali solution of aluminic acid to form a slurry and heating the slurry to a temperature of 60 to 90° C., thereby partially dissolving and separating at their grain boundaries to primary particles. The secondary particle size thereof is from 10 to 35 $\mu$m, preferably from 10 to 25 $\mu$m, and the specific surface area is 1.0 $m^2/g$ or less, preferably 0.8 $m^2/g$ or less. If the secondary particle size is less than 10 $\mu$m, the particle size is close to that of the fine particulate aluminum hydroxide Z described later and therefore, the effect of reducing the viscosity when the particles are blended is low, whereas if the secondary particle size exceeds 35 $\mu$m, the particle size is close to that of the coarse particulate aluminum hydroxide X described above and therefore, the effect of reducing the viscosity when the particles are blended is low. If the specific surface area exceeds 1.0 $m^2/g$, the curing after the filling into a resin takes a long time and this is not preferred.

The fine particulate aluminum hydroxide Z for use in the present invention can be obtained by grinding the agglomerate of agglomerated particles having a secondary particle size smaller than that of the coarse particulate aluminum hydroxide X obtained by the Bayer's process, using a conventionally known dry or wet grinder of which kind is not particularly limited or by adding the above-described agglomerate to an alkali solution of aluminic acid to form a slurry and heating the slurry to a temperature of 60 to 90° C., thereby partially dissolving and separating at their grain boundaries to primary particles. The secondary particle size thereof is from 0.5 to 10 $\mu$m, preferably from 0.5 to 8 $\mu$m, and the specific surface area is 3.0 $m^2/g$ or less, preferably 2.0 $m^2/g$ or less. If the secondary particle size exceeds 10 $\mu$m, the particle size is close to that of the medium particulate aluminum hydroxide (Y) described above and therefore, the effect of reducing the viscosity when the particles are blended is low, whereas if the secondary particle size is less than 0.5 $\mu$m, the handleability disadvantageously deteriorates to an extreme extent. If the specific surface area exceeds 3.0 $m^2/g$, the curing after the filling into a resin takes a long time and this is not preferred.

The present invention further provides a resin composition comprising the fine particle of aluminum hydroxide having the above-described properties. The resin composition comprising the fine particle of aluminum hydroxide of the present invention is not limited in the composition thereof as long as the viscosity measured at 35° C. by a Brookfield viscometer is less than 200 poises. The resins capable of satisfying this viscosity requirement can be used without limit.

In the present invention, when, for example, a ternary system fine particle of aluminum hydroxide (fine particles each containing three components of X, Y and Z) is filled into a resin, the resin is not limited as described above, however, examples of the resin include unsaturated polyester resin, acrylic resin, vinyl ester resin, epoxy resin, xylene formaldehyde resin, guanamine resin, diallyl phthalate resin, phenol resin, furan resin, polyimide resin, melamine resin and urea resin. Among these, preferred are unsaturated polyester resin, acrylic resin, vinyl ester resin and epoxy resin.

The resin composition of the present invention is preferably a resin composition for forming an artificial marble and for example, the resin for forming an artificial marble is at least one selected from unsaturated polyester resin, acrylic resin, vinyl ester resin and epoxy resin.

The method for blending the fine particle of aluminum oxide is not particularly limited and a conventionally known method may be used therefor, such as air blender, V-shape blender, rocking blender and Henschel mixer.

The fine particle of aluminum hydroxide of the present invention may be surface-treated by a conventionally known method and the method is not limited.

The present invention also provides a cured product of the above-described curable resin composition comprising the fine particle of aluminum hydroxide.

BEST MODE FOR CARRYING OUT THE INVENTION

The present invention is described in greater detail below by referring to the Examples, however, the present invention should not be construed as being limited to these Examples.

EXAMPLES 1 to 5

At least two components of a coarse particulate aluminum hydroxide x having a secondary particle size of 84 μm and a specific surface area of 0.2 m²/g, a medium particulate aluminum hydroxide Y having a secondary particle size of 16.5 μm and a specific surface area of 0.5 m²/g and a fine particulate aluminum hydroxide Z having a secondary particle size of 5.9 μm and a specific surface area of 1.6 m²/g were blended at a compositional ratio shown in Table 1 by a V-shape blender for 10 minutes to obtain fine particles each comprising a blend of particulate aluminum hydroxides.

To 100 parts by mass of commercially available unsaturated polyester resin (Rigolac 2004WM-2, Showa Highpolymer Co., Ltd.), 200 parts by mass of the thus-obtained fine particle comprising a blend of particulate aluminum hydroxides was filled and the viscosity thereof was measured at 35° C. by a Brookfield viscometer. Separately, 150 parts by mass of the fine particle comprising a blend of particulate aluminum hydroxides was filled into 100 parts by mass of a commercially available unsaturated polyester resin (Polylite TP-123, produced by Dainippon Ink & Chemicals, Inc.) and as a curing catalyst, 2 parts by mass of a methyl ethyl ketone compound (Trigonox 63, produced by Kayaku Akzo Co.) was added thereto. The viscosity of the resulting composition was continuously measured at 35° C. by a Brookfield viscometer and the time period from the initiation of the measurement until the viscosity became immeasurable due to the curing of resin, namely, the curing time was measured.

COMPARATIVE EXAMPLES 1 to 12

At least two of the same components as those used in Examples 1 to 5 were mixed at the compositional ratio shown in Table 1 and then evaluation was performed in the same manner as in Examples 1 to 5.

COMPARATIVE EXAMPLE 13

A fine particle comprising a blend of particulate aluminum hydroxides was prepared using the same compositional ratio and the same components as in Example 1 except that a medium particulate aluminum hydroxide Y2 having a secondary particle size of 16.4 μm and a specific surface area of 1.4 m²/g was used, and the evaluation thereof was performed in the same manner as in Example 1.

COMPARATIVE EXAMPLE 14

A fine particle comprising a blend of particulate aluminum hydroxides was prepared using the same compositional ratio and the same components as in Example 1 except that a medium particulate aluminum hydroxide Z2 having a secondary particle size of 6.4 μm and a specific surface area of 3.2 m²/g was used, and the evaluation thereof was performed in the same manner as in Example 1.

FIG. 3 shows compositional mass ratios of the particulate aluminum hydroxides (X, Y, Z) used in the Examples and Comparative Examples.

TABLE 1

|  | Abbreviation in Figure | Secondary Particle Size [μm] and Specific Surface Area [m²/g] of Each Component | | | Compositional Ratio [mass %] | | | Evaluation Results | |
|---|---|---|---|---|---|---|---|---|---|
|  |  | Coarse Particle | Medium Particle | Fine Particle | Coarse Particle | Medium Particle | Fine Particle | Viscosity [poises] | Curing Time [min] |
| Example 1 | A | 84.0 μm, 0.2 m²/g | 16.5 μm, 0.5 m²/g | 5.9 μm, 1.6 m²/g | 50 | 25 | 25 | 130 | 15 |
| Example 2 | B | ↑ | ↑ | ↑ | 50 | 45 | 5 | 170 | 11 |
| Example 3 | C | ↑ | ↑ | ↑ | 80 | 0 | 20 | 170 | 15 |
| Example 4 | D | ↑ | ↑ | ↑ | 75 | 0 | 25 | 140 | 18 |
| Example 5 | E | ↑ | ↑ | ↑ | 60 | 20 | 20 | 150 | 15 |
| Comparative Example 1 | F | ↑ | ↑ | ↑ | 45 | 25 | 30 | 150 | 65 |
| Comparative Example 2 | G | ↑ | ↑ | ↑ | 45 | 40 | 15 | 190 | 43 |
| Comparative Example 3 | H | ↑ | ↑ | ↑ | 45 | 55 | 0 | 200 | 10 |
| Comparative Example 4 | I | ↑ | ↑ | ↑ | 50 | 50 | 0 | 200 | 10 |
| Comparative Example 5 | J | ↑ | ↑ | ↑ | 60 | 35 | 5 | 200 | 9 |
| Comparative Example 6 | K | ↑ | ↑ | ↑ | 70 | 20 | 10 | 210 | 10 |
| Comparative Example 7 | L | ↑ | ↑ | ↑ | 85 | 0 | 15 | 200 | 14 |
| Comparative Example 8 | M | ↑ | ↑ | ↑ | 70 | 0 | 30 | 140 | 25 |
| Comparative Example 9 | N | ↑ | ↑ | ↑ | 60 | 10 | 30 | 140 | 25 |
| Comparative Example 10 | O | ↑ | ↑ | ↑ | 50 | 10 | 40 | 140 | 37 |
| Comparative Example 11 | P | ↑ | ↑ | ↑ | 30 | 50 | 20 | 280 | 98 |
| Comparative Example 12 | Q | ↑ | ↑ | ↑ | 90 | 10 | 0 | 470 | 8 |
| Comparative Example 13 | — | ↑ | 16.4 μm, 1.4 m²/g | ↑ | 50 | 25 | 25 | 240 | 44 |
| Comparative Example 14 | — | ↑ | 16.5 μm, 0.5 m²/g | 6.4 μm, 3.2 m²/g | 50 | 25 | 25 | 260 | 44 |

INDUSTRIAL APPLICABILITY

As apparent from Table 1, by blending particulate aluminum hydroxides having specific secondary particle sizes and specific surface areas at a specific ratio, when the fine particle of aluminum hydroxide is filled in plastic, rubber or the like, the viscosity is reduced and high filling can be attained. At the same time, in the case of filling the fine particle into a thermosetting resin, the curing time is very short and the productivity can be more increased. Thus, the fine particle of aluminum hydroxide according to the present invention can improve the properties required for the filling in a resin and accordingly, the industrial effect thereof is very high.

What is claimed is:

1. A fine particle of aluminum hydroxide comprising a particulate aluminum hydroxide X having a BET specific surface area of 1.0 $m^2/g$ or less and a secondary particle size of 35 to 150 $\mu$m, a particulate aluminum hydroxide Y having a BET specific surface area of 1.0 $m^2/g$ or less and a secondary particle size of 10 to 35 $\mu$m and a particulate aluminum hydroxide Z having a BET specific area of 3.0 $m^2/g$ or less and a secondary particle size of 0.5 to 10 $\mu$m, in a compositional mass ratio falling in the area surrounded by four points of Point α (X:Y:Z=47.5:25.0:27.5), Point β (X:Y:Z=47.5:50.0:2.5), Point ε (X:Y:Z=79:5:16) and Point φ (X:Y:Z=67.5:5:27.5) including the lines in the ternary composition diagram shown in FIG. 1 where the entire is assumed to be 100% by mass.

2. A fine particle of aluminum hydroxide comprising a particulate aluminum hydroxide X having a BET specific surface area of 1.0 $m^2/g$ or less and a secondary particle size of 35 to 150 $\mu$m, a particulate aluminum hydroxide Y having a BET specific surface area of 1.0 $m^2/g$ or less and a secondary particle size of 10 to 35 $\mu$m and a particulate aluminum hydroxide Z having a BET specific area of 3.0 $m^2/g$ or less and a secondary particle size of 0.5 to 10 $\mu$m, in a compositional mass ratio falling in the area surrounded by four points of Point A (X:Y:Z=50.0:25.0:25.0), Point B (X:Y:Z=50.0:45.0:5.0), Point C (X:Y:Z=80.0:0.0:20.0) and Point D (X:Y:Z=75.0:0.0:25.0) including the lines in the ternary composition diagram shown in FIG. 2 where the entire is assumed to be 100% by mass.

3. The fine particle of aluminum hydroxide as claimed in claim 1 or 2, wherein the particulate aluminum hydroxide X has a secondary particle size of 50 to 150 $\mu$m, the particulate aluminum hydroxide Y has a secondary particle size of 10 to 25 $\mu$m and the particulate aluminum hydroxide Z has a secondary particle size of 0.5 to 8 $\mu$m.

4. A resin composition comprising the fine particle of aluminum hydroxide claimed in claim 3, wherein the viscosity of the resin composition measured at 35° C. by a Brookfield type viscometer is less than 200 poises.

5. A resin composition comprising the fine particle of aluminum hydroxide claimed in claim 3, which comprises at least one resin selected from the group consisting of an unsaturated polyester resin, an acrylic resin, a vinyl ester resin and an epoxy resin.

6. A resin composition comprising the fine particles of aluminum hydroxide claimed in any one of claim 1 or 2.

7. A resin composition comprising the fine particle of aluminum hydroxide claimed in any one of claim 1 or 2, wherein the viscosity of the resin composition measured at 35° C. by a Brookfield type viscometer is less than 200 poises.

8. A resin composition comprising the fine particle of aluminum hydroxide claimed in any one of claim 1 or 2, which is a resin composition for forming an artificial marble.

9. A resin composition comprising the fine particle of aluminum hydroxide claimed in any one of claim 1 or 2, which comprises at least one resin selected from the group consisting of an unsaturated polyester resin, an acrylic resin, a vinyl ester resin and an epoxy resin.

10. A resin composition comprising the fine particle of aluminum hydroxide claimed in any one of claim 1 or 2, which is a cured resin composition.

11. A fine particle of aluminum hydroxide comprising a particulate aluminum hydroxide X having a BET specific surface area of 1.0 $m^2/g$ or less and a secondary particle size of 35 to 150 $\mu$m, a particulate aluminum hydroxide Y having a BET specific surface area of 1.0 $m^2/g$ or less and a secondary particle size of 10 to 35 $\mu$m and a particulate aluminum hydroxide Z having a BET specific area of 3.0 $m^2/g$ or less and a secondary particle size of 0.5 to 10 $\mu$m, in a compositional mass ratio falling in the area surrounded by four points of Point A (X:Y:Z=50.0:25.0:25.0), Point B (X:Y:Z=50.0:45.0:5.0), Point R (X:Y:Z=76.7:5:18.3) and Point S (X:Y:Z=70:5:25) including the lines in the ternary composition diagram shown in FIG. 2 where the entire is assumed to be 100% by mass.

* * * * *